(No Model.)
J. H. WIEHL.
STEAM ENGINE LUBRICATOR.
No. 290,828. Patented Dec. 25, 1883.
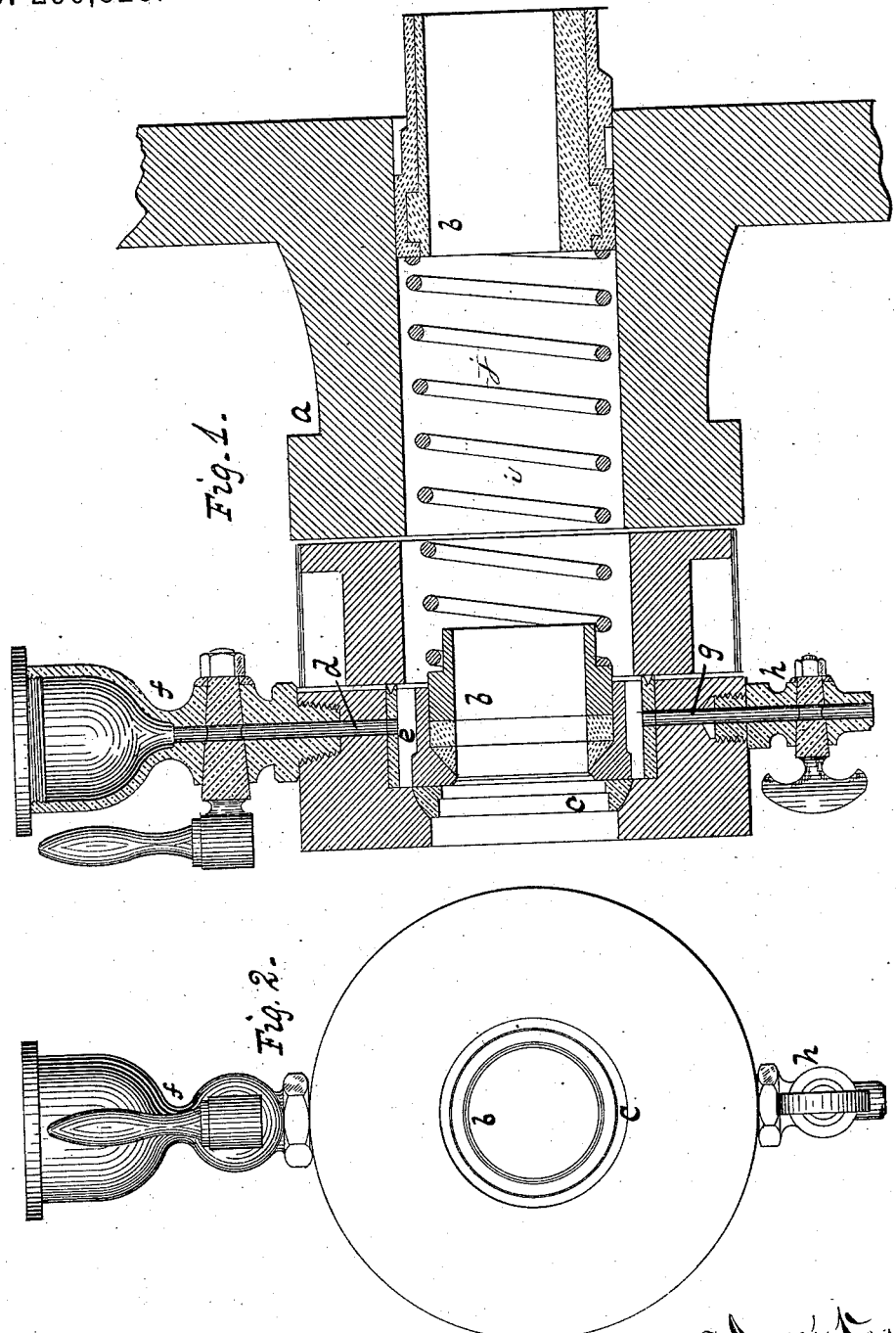

UNITED STATES PATENT OFFICE.

JOSEPH H. WIEHL, OF ALLEGHENY, PENNSYLVANIA.

STEAM-ENGINE LUBRICATOR.

SPECIFICATION forming part of Letters Patent No. 290,828, dated December 25, 1883.

Application filed September 27, 1883. (No model.)

*To all whom it may concern:*

Be it known that I, JOSEPH H. WIEHL, a citizen of the United States, residing at Allegheny city, in the county of Allegheny and State of Pennsylvania, have invented a new and Improved Means for Properly Effecting the Lubrication of Piston-Rods of Steam-Engines, which invention will be readily understood from the following description taken in connection with the accompanying drawings, wherein—

Figure 1 represents a longitudinal central section of a stuffing-box provided with metallic packing-rings in combination with my improvement; Fig. 2, a front end view of the same.

This invention has relation to improvements in lubricators; and it consists in the construction and arrangement of parts, as will be hereinafter described, and particularly pointed out in the claim.

At the present time metallic packings for piston-rods of steam-engines have nearly, if not wholly, superseded the use of all others, which metallic packings consist of two or more split rings inserted in the stuffing-box around the piston-rod, usually backed by a strong spiral spring, the whole being held in place by a gland or follower. As thus constructed the only means of lubricating the piston-rod consists in applying oil or tallow thereto at a point outside of the stuffing-box and packing, which mode of lubrication results in great waste, and is of little use, for at each reciprocation of the piston-rod through its tight packing a greater portion of the oil becomes so effectually wiped off that not enough remains for a proper lubrication of the parts, and the rings soon get dry, partly from the heat of steam, but more particularly by the increased friction resulting from an insufficiency of oil, and, as a consequence, the rings soon begin to adhere to the piston-rod and travel with it back and forth in the stuffing-box as far as the compression of the spring and its limits will allow. Such being the case, on the outward movement of the rod the springs will, by reason of their sudden relaxation, throw the rings with a slam of considerable force against the opposite or outward end of the stuffing-box, thereby not only injuring the joints and causing them to leak, but closing the rings tighter and tighter around the piston-rod, producing such friction as eventually destroys the rings, which, if properly lubricated, would last twice as long, keeping the joints perfectly steam-tight, and be less severe on the piston-rod.

The means I employ to put my invention into practice consist in the combination, with a stuffing-box, $a$, provided with metallic packing-rings $b$ and gland or follower $c$, of an oil-passage, $d$, that extends from the outside to a space, $e$, in the interior of said stuffing-box around and between the packing-rings $b$, in such a manner as that any suitable unctuous matter may be introduced into the stuffing-box for the purpose of lubricating the piston-rod and its surrounding rings, and to facilitate the introduction of oil or tallow for that purpose the said passage-way $d$ is provided with the usual construction of oil-cup $f$ screwed thereinto. The stuffing-box has an enlarged chamber, $i$, and the packing-rings $b$ are held to their seats by the constant force of the spring $j$; or, instead of such oil-cup, a pipe of any convenient length, and having a valve or cock, may be attached to said passage-way $d$, whereby oil may be supplied to the stuffing-box $a$ from any reasonably distant point.

My invention also comprises the above described stuffing-box $a$, packing-rings $b$, gland or follower $c$, and oil-passage way $d$, in combination with a blow-off channel, $g$, provided with a suitable valve or cock, $h$, for drawing off such water as may collect in the stuffing-box by the condensation of steam or otherwise.

I claim—

The lubricator herein described, consisting of the stuffing-box $a$, having an enlarged chamber, $i$, metallic packing-rings $b$, held to their seats by spring $j$, and packed, as shown, the gland or follower $c$, the oil-passage $d$, connecting the oil-cup $f$ with the annular space $e$, and the blow-off channel $g$, provided with a suitable valve or cock, $h$, for drawing off such water as may collect in the stuffing-box, as shown and described.

JOSEPH H. WIEHL.

Witnesses:
JOSEPH WILLIAMS,
SYL. STOTLER.